(12) United States Patent
Block et al.

(10) Patent No.: US 7,676,872 B2
(45) Date of Patent: Mar. 16, 2010

(54) AUTOMATED SLEEP SYSTEM

(76) Inventors: Paul Block, 63 Mayfair Rd., Nesconset, NY (US) 11767; Michael Lydick, 1021 Riverpoint Dr., East Bend, NC (US) 27018

( * ) Notice: Subject to any disclaimer, the term of this patent is extended or adjusted under 35 U.S.C. 154(b) by 113 days.

(21) Appl. No.: 11/732,625

(22) Filed: Apr. 4, 2007

(65) Prior Publication Data

US 2007/0239370 A1    Oct. 11, 2007

Related U.S. Application Data

(60) Provisional application No. 60/789,472, filed on Apr. 5, 2006.

(51) Int. Cl.
    *A47C 17/00* (2006.01)
(52) U.S. Cl. .................. 5/690; 5/933; 606/238; 606/239
(58) Field of Classification Search .......... 5/933, 5/690; 601/49, 56–58; 606/238–239; 267/89, 267/169, 177, 178
    See application file for complete search history.

(56) References Cited

U.S. PATENT DOCUMENTS

| | | | | |
|---|---|---|---|---|
| 4,799,276 A * | 1/1989 | Kadish | ........................... | 5/613 |
| 5,192,304 A * | 3/1993 | Rassman | ..................... | 606/238 |
| 5,542,907 A * | 8/1996 | Chou | ........................... | 601/46 |
| 5,625,914 A * | 5/1997 | Schwab | ......................... | 5/690 |
| 6,471,197 B1 * | 10/2002 | Denk et al. | .................. | 267/175 |
| 6,915,538 B2 * | 7/2005 | Treon | ............................. | 5/611 |

* cited by examiner

*Primary Examiner*—Peter Cuomo
*Assistant Examiner*—William Kelleher
(74) *Attorney, Agent, or Firm*—Tutunjian & Bitetto, P.C.

(57) ABSTRACT

An system for providing a highly adjustable sleep system has box frame assembly and a mattress assembly with a plurality of support cylinders, where the support cylinders may be spring loaded or pneumatic. The pressure of each individual support cylinder may be automatically adjustable by changing the tension on a spring, or by modifying the internal air pressure of a pneumatic support cylinder. The box frame may have a moving tool head configured to move along a gantry and carriage assembly, and having actuators to engage valves on the bottom of each pneumatic support cylinder to add or release compressed air from a pneumatic support cylinder. Each support cylinder may have sensors or therapeutic modules, which may be controlled and monitored by a control module in the box frame assembly.

16 Claims, 4 Drawing Sheets

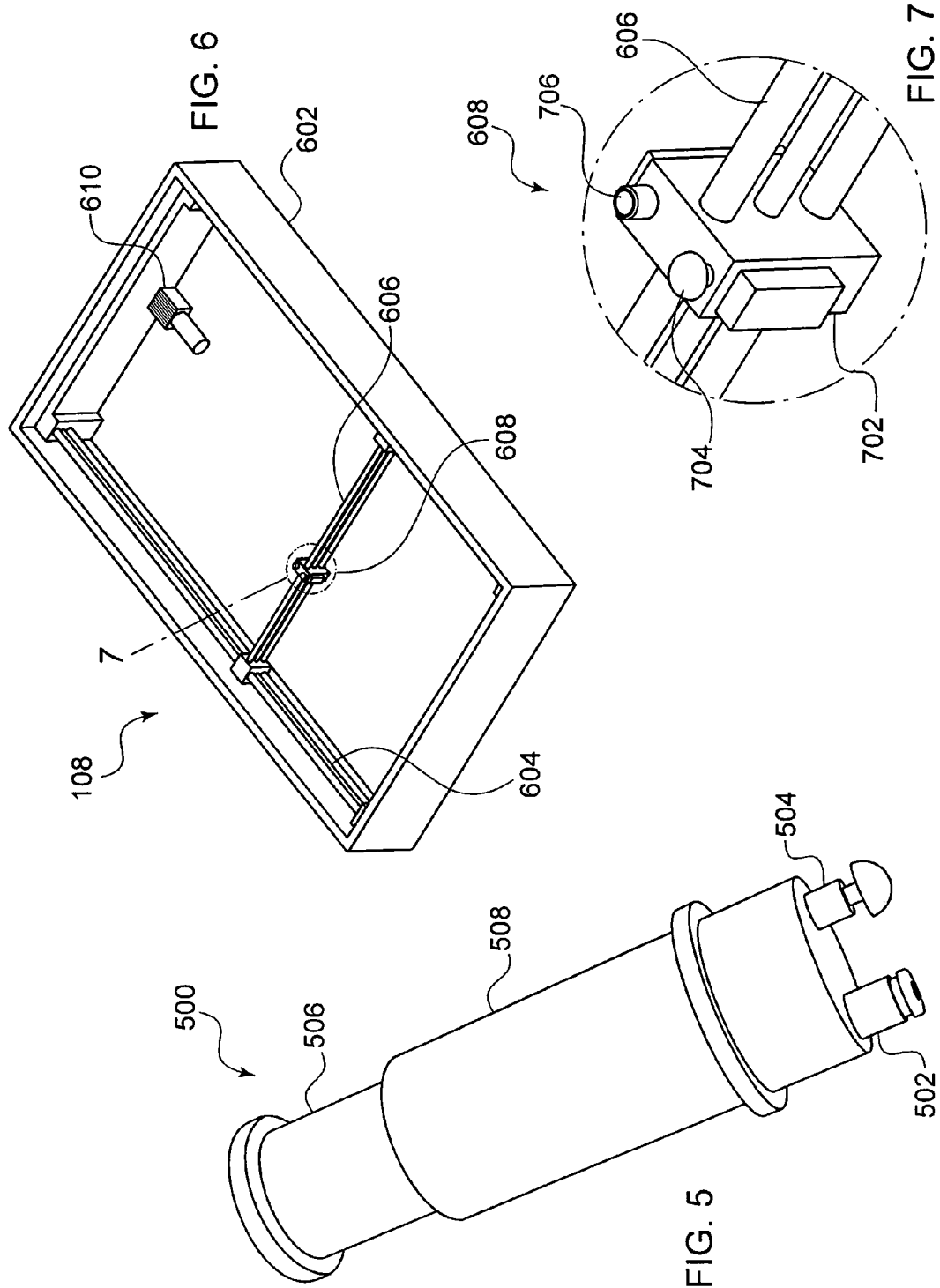

AUTOMATED SLEEP SYSTEM

RELATED APPLICATIONS

The present utility application claims the benefit of the Provisional Application, Ser. No. 60/789,472, titled "Automated Sleep System", filed in the names of Michael Lydick and Paul Block on Apr. 5, 2006.

TECHNICAL FIELD

The present principles generally relate to adjustable bedding, and more particularly, to an apparatus providing a highly adjustable automated sleep system.

BACKGROUND

Manufacturers of bedding and sleep products have attempted to produce mattresses that conform to the comfort preferences of an individual through a plurality of means. These efforts have included steel inner spring mattresses, including independent 'pocket coil' systems, foam mattresses, air mattresses, inflatable air bladders in mattresses, waterbeds, and the like.

However, no two consumers are alike in size, shape, personal fitness level, health, preferred sleeping position, or comfort preference. These and myriad factors affect the ability of a bed to compensate for the preferred firmness of each consumer. Additionally, the requirements of each consumer may change significantly over the course of a mattress's lifespan as a consumer's weight, activity level, health, and preferred seeping position change.

Conventional bedding manufacturers have attempted to compensate for the infinite combination of consumer preferences by releasing several models of firmness for each bedding line. In particular, manufacturers strive to have consumers fit into a soft/plush/firm/ultra firm class of bedding.

Similarly, manufacturers of adjustable air beds have attempted to compensate for differing consumer preferences by allowing for different pressures in one or more air bladders. However, the arrangement required of traditional air bladders generally provides for a limited number of air bladders within the mattress that span the width of the bed, or a single occupant's position on the bed. This arrangement provides far too low a resolution of adjustability to resolve the complexities and variances between individual users' sizes, weight, sleep patterns and the like. Additionally, as the size of each air bladder increases, the pressure within the air bladder may increase as the temperature within the room increases, or as the body heat from a slumbering user warms the air within each air bladder. Such changes to the internal air pressure of an air bladder also change the firmness of each air bladder.

Visco-elastic foam bed suppliers claim that their foam beds will conform perfectly to individual body types, regardless of physiological factors applicable to individual users. However, the preferences and requirements of each user vary so widely that a few limited classes of bed firmness, especially when applied across the entire mattress surface, are insufficient to provide optimum comfort for a wide variety of bed users.

SUMMARY

The present principles are directed to an apparatus for providing a highly adjustable automated sleep system. The system may include a mattress assembly and a box frame assembly. The mattress assembly may have a plurality of support cylinders with adjustable resistance to applied pressure, where the adjustable resistance is controlled in a manual fashion, or automatically adjusted by a control unit. In one embodiment, each support cylinder may be spring loaded, with the pretensioning on the spring being adjustable for each support cylinder. This adjustment may be accomplished via a screw type spring tensioning means, or by an adjustment motor controlled by a control module automatically adjusting each of the plurality of support cylinders.

In an alternative embodiment, the support cylinder may be pneumatic, with valves for raising and/or lowering the internal air pressure in each support cylinder. The plurality of support cylinders may be attached to a manifold capable of individually altering the pressure within each support cylinder. Alternatively, a movable tool head may be disposed within the box frame assembly underneath the mattress assembly, such that the tool head may move underneath the support cylinders, modifying the air pressure within each support cylinder individually through valves disposed in the bottom of each support cylinder.

Each support cylinder may also have therapeutic modules and/or sensors connected to a control unit capable of reading data from, or controlling, each therapeutic module or sensor. The control unit may have control software configured to read and generate reports or other data compilations regarding the readings from sensors. Additionally, the control software may be able to control therapeutic modules based on collected data, or from an entered therapeutic program. The control module may also include a communications means capable of transmitting data to a third party for the purposes of health diagnosis, sleep system adjustment, therapeutic program development, or the like.

BRIEF DESCRIPTION OF THE DRAWINGS

The advantages, nature, and various additional features of the present principles will appear more fully upon consideration of the illustrative embodiments now to be described in detail in connection with accompanying drawings wherein:

FIG. 5 is a diagram of an alternative embodiment of a support cylinder according to the present principles;

FIG. 6 is a diagram of a box frame assembly having an automated pressure adjustment system, according to the present principles;

FIG. 7 is a diagram of a movable tool head according to the present principles.

Figure 2:
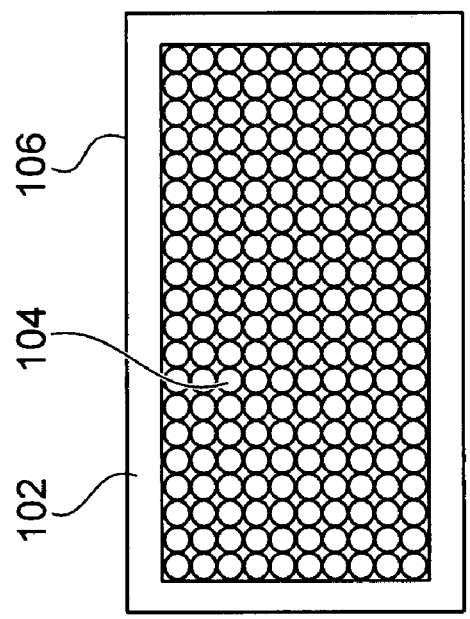
FIG. 2 is a top view of an automated sleep assembly according to the present principles.

It should be understood that the drawings are for purposes of illustrating the concepts of the present principles and are not necessarily the only possible configuration for illustrating the present principles.

DETAILED DESCRIPTION OF THE INVENTION

The present principles are directed a system relating to adjustable bedding, and more particularly, to an apparatus for providing a highly adjustable automated sleep system. The present embodiments present a bed that is universally adjustable with sufficient resolution to conform to an individual user's unique physiological needs. Additionally, the present principles provide for a simple, universal bed construction methodology that eliminates the hundreds of different spring, foam, quilting pattern combinations that are currently used to provide varying support levels on conventional mattresses. The presented sleep system further describes an intelligent control and feedback system allowing a user to customize their sleep experiences using a resolution of firmness adjustability heretofore unknown.

It should be understood that the present principles are described in terms of a system providing an adjustable sleep system; however, the present principles are much broader and may include any adjustable furnishing system. The present principles are described in terms of embodiments for providing adjustable sleep systems; however, the concepts of the present principles may be extended to other embodiments and bedding systems.

It should be further understood that some of the elements shown in the FIGS. may be implemented in various forms of hardware, software or combinations thereof. Each element may be implemented in any combination of hardware and software, which may be executed on one or more appropriately programmed general-purpose computing devices. The general computing devices may include any combination of any known, or as yet undiscovered, processor, memory or input/output interfaces.

The functions of the various elements shown in the figures may be provided through the use of dedicated hardware as well as hardware capable of executing software in association with appropriate software. When provided by a processor or element, the functions may be provided by a single dedicated processor, by a single shared processor, or by a plurality of individual processors, some of which may be shared. Moreover, explicit use of the term "control module", "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any elements shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, but not limited to, for example, mechanical, electrical, pneumatic, hydraulic or other physical elements in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. Any means that can provide those functionalities are equivalent to those shown herein.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended to aid the reader in understanding the present principles and the concepts contributed by the inventor to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, such equivalents may include both currently known equivalents as well as equivalents as yet undeveloped, including any elements developed in the future that perform the same function, regardless of structure.

Figure 1:
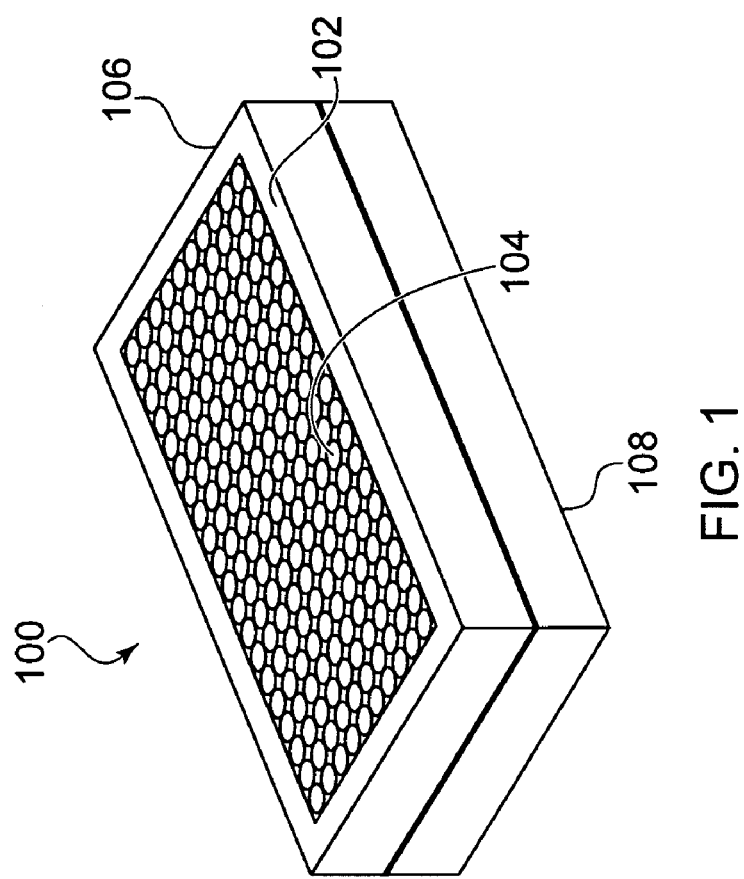
FIG. 1 is a perspective view of an automated sleep assembly according to the present principles.

Referring now in specific detail to the drawings in which like reference numerals identify similar or identical elements throughout the several views, and initially to FIG. 1, a perspective view of an automated sleep assembly 100 according to the present principles is depicted. The sleep assembly 100 may be generally comprised of a mattress assembly 106 and a box frame assembly 108.

The mattress assembly 106 is made up of a plurality of support cylinders 104 arranged in a matrix, and bounded by mattress edging 102. In one useful embodiment, the support cylinders 104 are adjustable with regard to the force, or applied pressure, necessary to depress each support cylinder 104 a given distance. Additionally, the support cylinders 104 may be arranged in a pattern where the tops of the support cylinders 104 provide substantial support for a person lying on top of the mattress assembly 106.

As shown in FIG. 1, the support cylinders 104 may have round top faces, but may also advantageously have square, hexagonal, or any other shape of top surface permitting a matrix of support cylinders 104 to provide a largely contiguous surface. Furthermore, while shown in FIG. 1 as round, the bodies of the support cylinders 104 themselves may be squares, hexagons, octagons, or any other shape that may allow for a higher density of support cylinders within a given area. Such advantageous support cylinder 104 shaping permits for the support cylinders to be compacted against one another, while still allowing independent action by each individual support cylinder 104.

The support cylinders 104 may, in useful embodiments, be arranged and assembled in discrete rows or columns, in banks of rows and/or columns. Furthermore, the support cylinders 104 may be assembled such that a discrete assembly of support cylinders 104 is used for strategic areas of the sleeping surface. For instance, support cylinders in the hip area may be assembled together, and support cylinders 104 in the torso, leg area, or the like, may comprise a single unit.

The support cylinders 104 may be produced and assembled independently, and later joined together on a core manifold, which may, in turn have an array of attachment locations for the individual support cylinders 104. Alternatively, the manifold may be molded or machined from a single piece of material, with bases for each of the support cylinders 104 integrated into the manifold, and forming a single unit. In such an embodiment, each support cylinder 104 may be assembled onto the bases integrated into the manifold.

The support cylinder 104 matrix may be surrounded and supported by mattress edging 102. In one particularly useful embodiment, the mattress edging 102 may be of a soft foam material or the like, to protect the exposed sides of the individual support cylinders 104. Additionally, the mattress edging 102 may be of sufficient firmness and stability to provide support for the mattress assembly 106 when, for example, a person sits on the edge of the mattress assembly 106. Furthermore, by surrounding the support cylinder 104 matrix with mattress edging 102, the support cylinders 104 will be reinforced to prevent the support cylinders 104 from inadvertently separating from adjacent support cylinders 104 upon the application of uneven pressure to one or more support cylinders 104. For example, if a user lying on the top surface of the mattress assembly 106 were to roll over, some of the support cylinders 104 may be inclined to push away from neighboring support cylinders 104, leaving gaps or a crevice between rows or columns of support cylinders 104, resulting in a less than optimal support arrangement.

FIG. 2 illustrates a top view of the mattress assembly 106, where it may be seen that the support cylinders 104 are bounded and supported by the mattress edging 102. The inclusion of mattress edging 102 assists in keeping the support cylinders 104 upright and packed tight against adjacent support cylinders 104, preventing separations, gaps, or the like, between rows or columns of support cylinders 104.

The mattress assembly 106 may be further encased in a cover. In one useful embodiment, a cover may be used to provide additional padding and aesthetic appeal to the mattress assembly 106. It is well known in the bedding arts to use a cover, having padding, quilting, foam or similar materials over the traditional springs of a mattress. According to the present principles, a similar covering may be used to provide additional padding and comfort over the top faces of the support cylinders 104. However, in one useful embodiment, the padded cover may avoid encasing the bottom of the mattress assembly 106 such that the bottom surfaces of each support cylinder 104 may be accessed.

Figure 3:
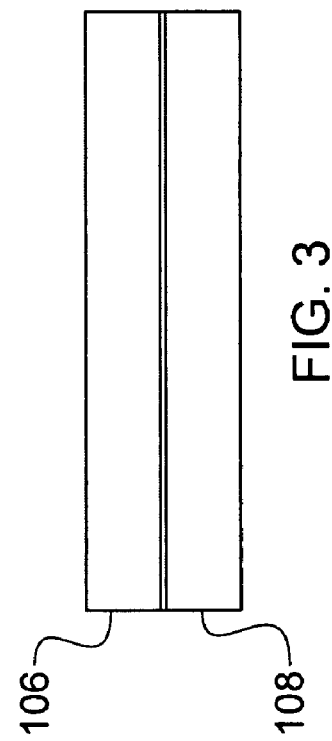
FIG. 3 is a side view of an automated sleep assembly according to the present principles.

FIG. 3 depicts a side view of the automated sleep assembly 100. It can be seen that the mattress assembly 106 may reside on a separate box frame assembly 108. Artisans skilled in the art of bed manufacturing will recognize that placing a mattress on top of a box spring is commonplace in bed assembly. Here, the mattress assembly 106 may be placed onto a box frame assembly 108 to raise the top surface of the mattress assembly to a height normally associated with beds. Additionally, the use of a box frame assembly 108 allows the inclusion of sensors, control units, air compressors and the like without significantly altering the space requirements of the automated sleep assembly 100 when compared to a conventional bed. Furthermore, the use of a separate mattress assembly 106 and box frame assembly 108 allows for easier setup and transport. In the case of either the mattress assembly 106 or box frame assembly 108 needing to be replaced, this separation of assemblies allows for the separate replacement or repair of the individual assembly.

Figure 4:
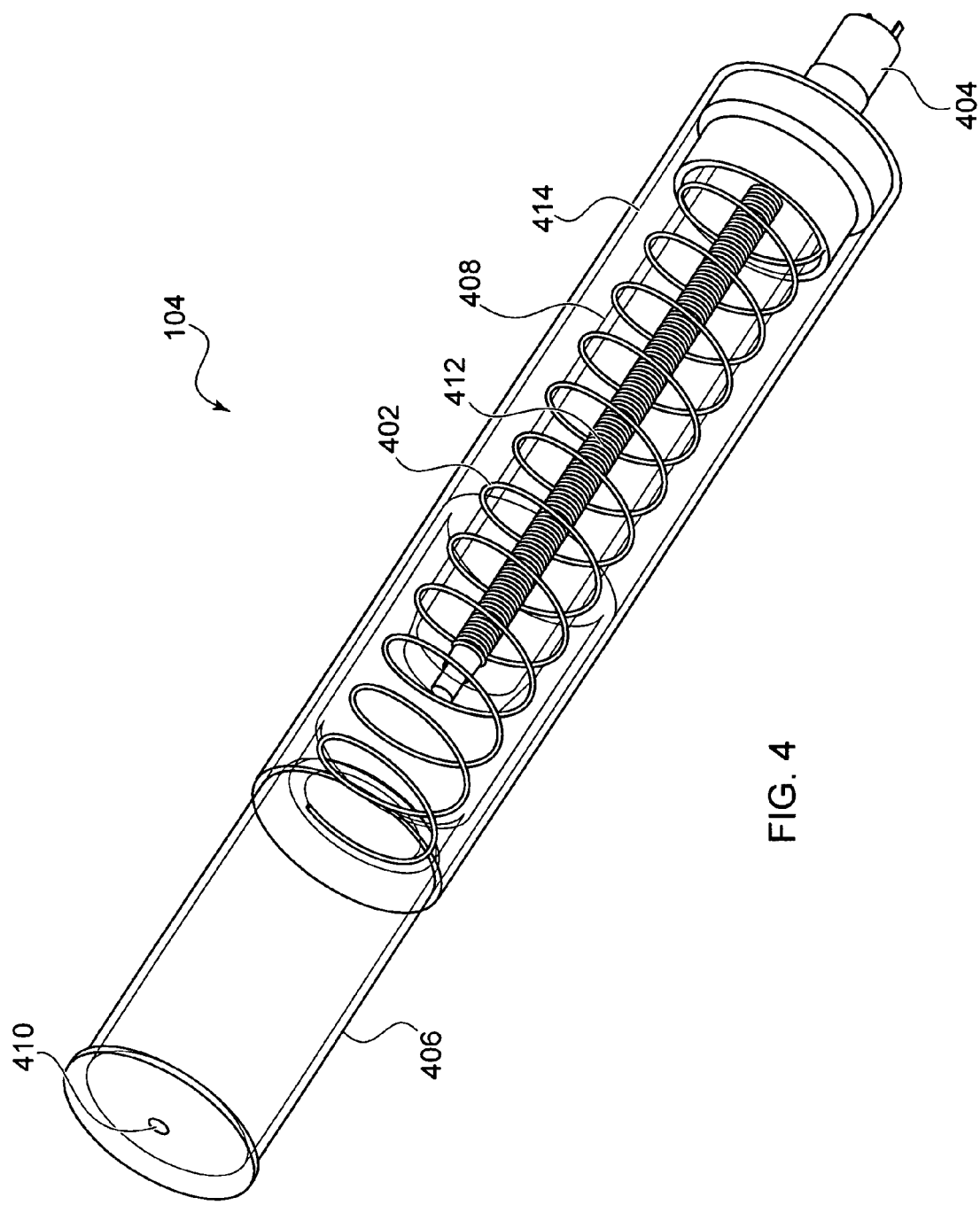
FIG. 4 is a diagram of a support cylinder according to the present principles.

FIG. 4 depicts a diagram of a useful embodiment of a support cylinder 104 in accordance with the present principles. In this embodiment of a support cylinder 104, the support cylinder 104 makes use of a spring 402 to provide support for a user. In particular, the spring-loaded support cylinder 104 may have a fixed outer sleeve 414 covering the spring 402 and any other interior elements. A movable inner sleeve 406 may be attached to the spring 402 to form a piston-like assembly, and may slide within the outer sleeve 414. Such an arrangement allows for movement of the inner sleeve 406 such that the inner sleeve 406 is extended when no pressure is being applied to the inner sleeve 406, and may be pressed into the outer sleeve 414, compressing the spring 402 when pressure is applied to the top surface of the inner sleeve 406. Alternatively, instead of a spring 408, the cylinder may advantageously contain foam, rubber, a compressible gas, or any other resilient or compressible material.

As discussed above, the body of the support cylinder 104 may be in any advantageous shape, such as a square, hexagon, octagon, or the like. For instance, in the embodiment shown in FIG. 4, both the fixed outer sleeve 414 and the slideable inner sleeve 406 may be hexagonal in cross section. Thus, the inner sleeve 406 would still fit within the outer sleeve 414, and operate in a piston-like fashion, while allowing for more support cylinders 104 to be fitted into a designated space.

The inner sleeve 406 may have an accessory hole 410 for mounting secondary or therapeutic modules such as, but not limited to, massage modules, heating and cooling modules, magnetic modules, light therapy modules, sensors, any combination of modules, or any other like or useful module. In one useful embodiment, a power or communications cable may be disposed within the support cylinder 104, passing through the accessory hole 410 to power the secondary modules, or to provide communications and data between any affixed module and a processing or control unit. For instance, a pressure sensor may be disposed on the top surface of the support cylinder 104, in communication with a control module, where the pressure sensor may be configured to detect when a user is laying on, or making use of, the particular support cylinder 104. Additionally, each support cylinder may have a sensor disposed within the support cylinder 104 configured to dynamically detect the displacement, or compression, of the respective support cylinder 104. Thus, the deflection of each support cylinder 104 may be determined, and the position of a user calculated.

The support cylinder 104 may further include a core sleeve 408 disposed within the coils of the spring 402 to advantageously provide lateral support to the spring 408, preventing the spring from buckling under high pressures, and protecting any other internal elements from contacting or interfering with the operation of the spring 408. Disposed within the support cylinder 104 may also be an adjustment rod 412, which may be adjustably connected to the base of the support cylinder. In one useful embodiment, the adjustment rod 412 may be used to adjust the initial position of the sliding inner sleeve 406 or to pretension the spring 402. Thus, each support cylinder 104, having an independent adjustment means, may be individually adjusted to provide a high resolution pressure profile tailored to a user's unique physiological requirements.

Alternately, a support cylinder 104 may have an integrated adjustment motor capable of automatically adjusting the spring 402 tension of the support cylinder 104. Each support cylinder 104 may be connected to a control unit, where the control unit manages the integrated adjustment motor in each support cylinder 104 to effectively control the pressure, or spring tensioning, or each individual support cylinder 104.

Each support cylinder 104 may further include an attachment module 404 allowing the support cylinder 104 to be removably attached to a support structure, manifold, matrix, or the like, within the mattress assembly 106. The attachment module 404 may be threaded, with a corresponding receiving attachment point disposed within the manifold inside the mattress assembly 106, or the attachment module 404 may be a twist-lock type attachment module. It should be understood that any advantageous attachment method or means may be used without deviating from the present principles. In one useful embodiment, the adjustment mechanism and attachment module 404 may be accessible through the bottom of the mattress assembly 106, so that adjustments, repairs or replacements of individual support cylinders 104 may be accomplished.

FIG. 5 is a diagram depicting an alternative embodiment of a support cylinder 500. In this useful embodiment, the support cylinder 500 is a pneumatic type, having an outer sleeve 508 and a slideable inner sleeve 506 arranged to form a pneumatic piston-type assembly resistant to force applied along the vertical axis of the support cylinder 500. In such an embodiment, the inner sleeve 506 may conform to the inside surface of the outer sleeve 508 to provide an airtight seal. This airtight seal may allow for the pressurization of the support cylinder 500 such that the support cylinder 500 maintains an air pressure higher than atmospheric pressure, and advantageously provides a cushioning effect when force is applied to the upper surface of the inner sleeve. Furthermore, the pneumatic embodiment of the support cylinder 500 may be adjustable in firmness by changing the interior air pressure of the support cylinder 500. This adjustment may be accomplished by the inclusion of a pressurizing nozzle 502 and an exhaust valve 504. As shown in FIG. 5, the pressurization nozzle 502 and exhaust valve 504 may be separate elements, but these two elements may be advantageously combined into a single element capable of both exhaust and pressurization.

The pneumatic embodiment of the support cylinder 500 may also include a spring, foam insert, or other damping element to prevent bouncing, or excess oscillations in the support cylinder 500 when a user initially lays down, moves, rolls over, other otherwise changes the weight distribution across the top of the mattress assembly 106, and thus across the each of the support cylinders 500. It should be noted that, by having a pressurization nozzle 502 and exhaust valve 504 on each individual support cylinder 500, each support cylinder 500 in a matrix or arrangement may be pressurized to a different level, permitting the creation of a comfort level tailored to an individual user. Furthermore, by allowing each support cylinder 500 to be adjusted while assembled in the bed and in use, the pressurization level of each support cylinder 500 may be dynamically varied based on almost any desirable factor.

The plurality of pneumatic support cylinders 500 may be connected to a manifold to form a matrix, where the manifold has dedicated pressurization lines connected to each individual pneumatic support cylinder 500. Thus, in this embodiment, each pneumatic support cylinder 500 may be individually pressurized or depressurized through the manifold.

Alternatively, a single pressurization mechanism may be moved underneath each of the pneumatic support cylinders 500 in a matrix, inflating each support cylinder 500 in turn. In such an embodiment, the pressurization mechanism may physically interact with the pressurization nozzle 502 and exhaust valve 504 to modify the support cylinders' 500 internal air pressure.

FIG. 6 depicts a box frame assembly 108 having a movable tool head 608 capable of pressurizing or depressurizing each support cylinder 500 in a matrix. Here, the box frame assembly 108 is shown with the mattress assembly 106 removed for clarity.

In such an embodiment, the box frame assembly 108 may have a carriage assembly 606 moving along a gantry 604, rails, or any other side-supporting apparatus allowing the carriage assembly 606 to travel the length of the box frame assembly 108. The gantry 604 may be advantageously disposed within the frame 602 of the box frame assembly, where the frame 602 supports and protects the workings of the gantry 604, and prevents a user from inadvertently coming into contact with a potentially moving carriage assembly 606. The carriage assembly 606 may have integral electric motors allowing the carriage assembly 606 to traverse the length of the box frame assembly on rails of the gantry 604. In an alternative embodiment, the gantry may have a belt drive, where the carriage assembly 606 is fixed to the belt, and the belt is pulled by motors affixed to the box frame assembly 108. In yet another useful embodiment, the gantry 604 may have a screw drive type mechanism that is rotated by a motor within the gantry 604 causing the carriage assembly 606 to advance forward and backward along the length of the box frame assembly 108. It should be noted that any other method, element or apparatus for moving the carriage assembly 606 may be advantageously used without departing from the spirit and teachings of the present principles.

The carriage assembly 606 may have a movable tool head 608 disposed on the carriage assembly 606, such that the tool head 608 may move along the width of the box frame assembly 108. Thus, when moved in combination with the carriage assembly 606, the tool head 608 may move along the length and width of the box frame assembly 108 in any direction. Like the gantry 604, the carriage assembly 606 may include a belt drive, screw drive, or the like for moving the tool head 608 along the length of the carriage assembly 606.

The box frame assembly 108 may further include a control unit 610 capable of determining the position of the tool head 608, and controlling the pressurization of each individual pneumatic support cylinder 500. Additionally each support cylinder 500 may be communicatively connected to the control unit 610 so that the control unit 610 may aggregate data from the sensors disposed on each of the plurality of support cylinders 500. For instance, the control unit 610 may read data from pressure sensors at each support cylinder 500 to form a pressure map indicating a user's position on the mattress assembly 106.

FIG. 7 depicts a detailed view of the movable tool head 608 according to the present principles. The tool head 608 may be comprised, in part of a tool head body 702 configured to enclose and support any internal components of the tool head 608.

The tool head 608 may advantageously be carried by the carriage assembly 606. In one useful embodiment, the tool head 608 may move along rails or the like of the carriage assembly 606. The tool head 608 may be moved along the length of the carriage assembly 606 by a mechanism powered at the carriage assembly 606, such as a screw drive, belt drive, pushrod, or the like. Alternatively, the tool head 608 may have an independent motor or other movement mechanism disposed within the tool head 608 such that the impetus for movement of the tool head 608 is contained within the tool head 608 itself. For example, the carriage assembly 606 may have a fixed, toothed track, and the tool head 606 may have a motor disposed within the tool head body 702 with a correspondingly toothed gear on the driveshaft of the motor, where the turning of the motor driveshaft causes the toothed gear to pull the tool head 608 along the carriage assembly.

The tool head 608 may advantageously have an exhaust actuator 704 and a pressure nozzle actuator 706. In particularly useful embodiments, both the exhaust actuator 704 and the pressure nozzle actuator 706 may be configured to move upwards to come in contact with the exhaust valve 504 and pressurizing nozzle 502 a pneumatic support cylinder 500 to raise or lower the pneumatic pressure in the pneumatic support cylinder 500 by increasing or decreasing the amount of air contained within the pneumatic pressure cylinder 500. Thus, when combined with the movement of the carriage assembly 606 along the gantry 604, and the movement of the tool head along the carriage assembly 606, the tool head 608 may be positioned under any pneumatic support cylinder 500, and the pressure nozzle actuator 706 and/or exhaust actuator 704 activated to come into contact with the respective valves on the bottom of the pneumatic support cylinder 500, allowing each support cylinder 500 to be inflated independently to a unique pressure. Such individual support cylinder 500 pressure customization allows for a pressurization profile unique to an individual user's preferences or physiological requirements.

In one useful embodiment, each of the movement mechanisms may track where within the box frame assembly 108 the tool head 608 is positioned. For instance, each movement motor may be a servo type motor capable of indicating the movement the servo has imparted to the related gantry 604, carriage assembly 606, or tool head 608 element. Each of these sensors may feed back the position information to the control unit 610 so that the control unit 610 may accurately direct the movement mechanisms to move the tool head 608 to a desired position.

The tool head 608 may advantageously have a compressed air source, such as an air compressor disposed within the tool head body 702, where the compressed air source is configured to provide compressed air to pressurize a pneumatic support cylinder 500. Alternatively, a compressed air source may be fixed within the box frame assembly 108, with a supply hose connecting the compressed air source to the tool head 608, allowing the tool head 608 to provide compressed air via the supply hose.

The tool head 608 may further include sensors within the tool head body 702 so that the tool head may read the pressure of each pneumatic support cylinder 500. Additionally, the tool head 608 may have a receiver connector enabling the tool head to connect to sensors located on each support cylinder 500 to receive data from sensors such as strain gauges, pressure sensors, cylinder displacement sensors, temperature sensors, biometric sensors, or the like that may be advantageously disposed within each support cylinder 500. The tool head 608 may the collect such data from each support cylinder 500 as it moves throughout the support cylinder matrix, and may communicate the collected to the control unit 610.

Figure 8:
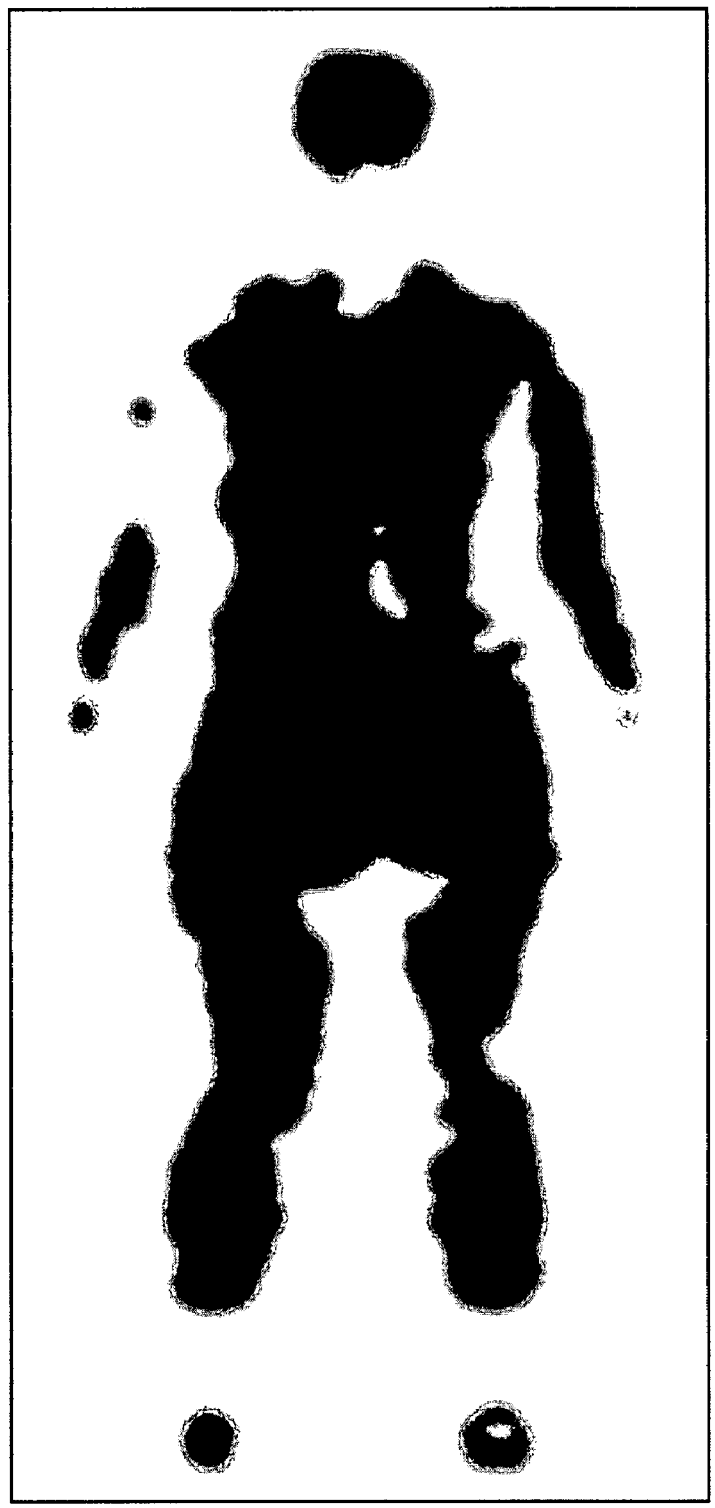
FIG. 8 is a diagram of an exemplary pressure map output according to the present principles.

As described above, the control unit 610 may aggregate pressure data from each of the support cylinders 500. FIG. 8 is an exemplary pressure map as may advantageously be calculated by the control unit 610. It should be understood that the higher the number of support cylinders 500 that are present within the mattress assembly 106, the more accurate the pressure map. More specifically, with more support cylinders 500 and more sensors disposed within a given area, more data points may be gathered to create the pressure map. Thus, in some useful embodiments, the sensor array disposed across the top surfaces of the support cylinders 104 is comprised of the individual support cylinder 104 sensors.

Referring to FIG. 8, it can be seen that the pressure points for a user on his back may be aggregated to roughly determine what position a user is laying on the mattress assembly 106 surface. This determination of user position may be used by the control unit 610 to adjust the individual support cylinders 500 to the preferred pressures for selected parts of the user's body. For instance, when a user is sleeping on their side, they may prefer greater support, or a stiffer sleep surface, under the user's hips, and a softer surface under the user's shoulders. The control unit 610 may adjust the pressures of related support cylinders 500 to conform to a pressure profile associated with a particular user upon the control unit determining the position of a user.

Alternatively, the mattress assembly 106 may have a sensor cover disposed on the top surface having a sensor array for taking pressure and/or temperature readings across the surface of the mattress assembly with a resolution sufficiently high to accurately form a pressure map. In one useful embodiment, the sensors may be disposed in the mattress assembly 106 cover, discussed above.

Additionally, the support cylinders or sensor cover may have biometric sensors capable of taking readings such as pulse, respiration, brain wave activity and the like, which may be used to monitor, for example, the health or sleep stage of a user. Alternatively, the user may physically attach biometric sensors to their body, the readings of which are collected by sensors disposed within the mattress assembly 106 or box frame assembly 108. After collecting the pressure map, temperature readings, biometric readings and the like, the control module 610 may adjust the pressure of each support cylinder 500 to promote desired circulation patterns of fluids in the body, prevent bed sores, reduce water retention, promote healing in specified areas of the body, and the like.

The control unit 610 may further control the pressures within support cylinders 500 by pressurizing and/or depressurizing each cylinder in a sequence to create a dynamic wave like effect, either across the entire body, or selected portions of a user's body to promote optimal circulation, respiration, sleep, and/or sleep depth.

The control software residing on the control unit 610 may be configured to perform functions integral to the control of the sleep assembly 100, such as receiving and interpreting sensor data, allowing for the entry of individual user comfort profiles, using the user profiles to execute actions based on pressure maps, sensor readings, user input and/or voice commands, or the like. Additionally, the control unit 610 software may be configured to provide output, visual or otherwise, provide individual reports or compilations of any of the data collected, any actions taken, or any other information residing in the control unit 610.

The software may also be configured to, upon detections of conditions such as unusually high pressure points, control the individual support cylinders in a manner to relieve the pressure point if the pressure point cannot be eliminated. For instance, a user whose elbow is pressing into the sleep surface may present an unusually high pressure point to the sensors, upon which the control unit may alternate pressure on each side of the elbow to prevent capillary pinching or other loss of circulation.

The control software may also be configured to accept sleeping programs including alarms or the like. For example, the control software 610 may trigger one or more massage module to vibrate, awakening a user at a desired time. Additionally, the alarms may include monitoring the sleep position of the user to alert the user that they are in an undesirable sleep position, which may include triggering an attached buzzer, vibration module or the like. The control software may further accept programs for physiological therapy, where the control software may control the massage modules, heating and cooling modules, magnetic modules, light therapy modules, or the like disposed on any support cylinder 500 in accordance with the physiological therapy program.

The control unit 610 may also include software for communicating diagnostic or calibration information via a network connection, phone connection, wireless connection, or the like. Thus, the control unit 610 may upload collected data to sleep system specialist, therapist, physician or the like for the purposes of physiological diagnosis, sleep system 100 calibration, physiological or therapeutic program development, or any other useful purpose.

Having described preferred embodiments a system for providing a highly adjustable automated sleep system (which are intended to be illustrative and not limiting), it is noted that modifications and variations can be made by persons skilled in the art in light of the above teachings. It is therefore to be understood that changes may be made in the particular embodiments of the present principles disclosed which are within the scope and spirit of the present principles as outlined by the appended claims. Having thus described the present principles with the details and particularity required by the patent laws, what is claimed and desired protected by Letters Patent is set forth in the appended claims.

What is claimed is:

1. An automated sleep system comprising:
a mattress assembly comprising:
    a plurality of support cylinders arranged into a support cylinder matrix, each support cylinder configured to compress independently of adjacent support cylinders, wherein each of the plurality of support cylinders have individually adjustable resistance to vertical pressure applied to the top surface of the support cylinder, wherein the support cylinders are comprised of a spring configured to provide resistance to vertical pressure, and wherein each support cylinder is further comprised of a motor configured to dynamically adjust the resistance to vertical pressure by adjusting a spring pretensioning;
    a sensor array disposed over the top surface of the mattress assembly; and
    mattress edging surrounding the sides of the support cylinder matrix, and configured to hold the support cylinders in contact with adjacent support cylinders preventing separation of adjacent support cylinders in response to pressure on a portion of the top surface of the support cylinder matrix; and
a box frame assembly configured to support the mattress assembly when the mattress assembly is placed on top of the box frame assembly, comprising:
    a frame; and
    a control module communicatively connected to the sensor array, configured to collect the data from the sensor array and generate data compilations based on the collected data, wherein the resistance to vertical pressure is automatically adjustable, the resistance to vertical pressure controlled by the control module.

2. The automated sleep system of claim 1, wherein support cylinders are comprised of:
an inner sleeve; and
an outer sleeve, the outer sleeve encasing a portion of the inner sleeve, and forming a airtight seal to accept pressurized air within the interior of the support cylinder, the pressurized air providing resistance to vertical pressure, the resistance to vertical pressure increased by increasing the interior air pressure, and decreased by decreasing the interior air pressure;
a pressurization nozzle disposed within the outer sleeve, and configured to accept pressurized air within the interior of the support cylinder; and
an exhaust valve disposed within the outer sleeve, and configured to release
pressurized air from the interior of the support cylinder.

3. An automated sleep system comprising:
a mattress assembly comprising:
    a plurality of support cylinders arranged into a support cylinder matrix, each support cylinder configured to compress independently of adjacent support cylinders, wherein each of the plurality of support cylinders have individually adjustable resistance to vertical pressure applied to the top surface of the support cylinder;
    a sensor array disposed over the top surface of the mattress assembly;
    mattress edging surrounding the sides of the support cylinder matrix, and configured to hold the support cylinders in contact with adjacent support cylinders preventing separation of adjacent support cylinders in response to pressure on a portion of the top surface of the support cylinder matrix; and
a box frame assembly configured to support the mattress assembly when the mattress assembly is placed on top of the box frame assembly, comprising:
    a frame; and
    a control module communicatively connected to the sensor array, configured to collect the data from the sensor array and generate data compilations based on the collected data, wherein the resistance to vertical pressure is automatically adjustable, the resistance to vertical pressure controlled by the control module;
wherein the support cylinders are comprised of:
an inner sleeve; and
an outer sleeve, the outer sleeve encasing a portion of the inner sleeve, and forming a airtight seal to accept pressurized air within the interior of the support cylinder, the pressurized air providing resistance to vertical pressure, the resistance to vertical pressure increased by increasing the interior air pressure, and decreased by decreasing the interior air pressure;
a pressurization nozzle disposed within the outer sleeve, and configured to accept pressurized air within the interior of the support cylinder; and
an exhaust valve disposed within the outer sleeve, and configured to release pressurized air from the interior of the support cylinder; and
wherein the box frame assembly further comprises a movable tool head configured to move within the box frame assembly, and configured to provide compressed air to individual support cylinders through the pressurization nozzle disposed within the support cylinder, and further configured to release air from the support cylinder by activating the exhaust valve disposed within the support cylinder.

4. The automated sleep system of claim 1, wherein the control unit controls the resistance to vertical pressure of each of the plurality of support cylinders in response to a user profile.

5. The automated sleep system of claim 4, wherein the control unit is configured to determine the position of a user based on reading from the sensor array, and further configured to control the resistance to vertical pressure of each of the plurality of support cylinders in response to the determined body position of the user.

6. The automated sleep system of claim 4, each of the support cylinders further comprising a therapeutic module, the control module controlling each therapeutic module in response to a therapeutic program.

7. An automated sleep system comprising:
a mattress assembly comprising:
    a plurality of support cylinders arranged into a support cylinder matrix, each support cylinder configured to compress independently of adjacent support cylinders, each of the support cylinders configured to have an independently adjustable pressurization level, wherein the support cylinders are comprised of a spring configured to provide resistance to vertical pressure, and wherein each support cylinder is further comprised of a motor configured to dynamically adjust the resistance to vertical pressure by adjusting a spring pretensioning;
    a sensor array disposed over the top surface of the mattress assembly, and
configured to provide physical data; and
    a box frame assembly configured to support the mattress assembly when the mattress assembly is placed on top of the box frame assembly, comprising:
    a frame; and a control module communicatively connected to the sensor array, configured to collect the data from the sensor array and generate data compilations based on the collected data, and configured to automatically adjust the pressure of each of the plurality of support cylinders.

8. The automated sleep system of claim 7, wherein the control module is further configured to transmit the collected data over a communications medium.

9. The automated sleep system of claim 7, wherein the data collected from each support cylinder comprises pressure applied to the support cylinder, and wherein the control module is configured to generate a pressure map depending on the collected pressure data.

10. The automated sleep system of claim 9, wherein the data collected further comprises temperature data.

11. An automated sleep system comprising: a mattress assembly comprising: a plurality of support cylinders arranged into a support cylinder matrix, each support cylinder configured to compress independently of adjacent support cylinders, each of the plurality of support cylinders configured to retain air pressure providing an independently adjustable pressure resistant to vertical force, wherein the support cylinders are comprised of a spring configured to provide resistance to vertical pressure, and wherein each support cylinder is further comprised of a motor configured to dynamically adjust the resistance to vertical pressure by adjusting a spring pretensioning; and a sensor array disposed over the top surface of the mattress assembly, and configured to provide physical data; and a box frame assembly configured to support the mattress assembly when the mattress assembly is placed on top of the box frame assembly, comprising: a frame; a gantry disposed along the length of the frame; a carriage assembly disposed along the width of the frame, and configured to move along the gantry; a movable tool head configured to move along the carriage assembly such that the tool head may move within the box frame assembly, and configured to provide compressed air to individual support cylinders to adjust the air pressure within each of the plurality of support cylinders.

12. The automated sleep system of claim 11, the box frame assembly further comprising a control module communicatively connected to the sensor array, configured to collect the data from the sensor array, and configured to automatically adjust the pressure of each of the plurality of support cylinders.

13. The automated sleep system of claim 12, the tool head further comprising an air compressor integrated within the tool head, the air compressor configured to provide the compressed air.

14. The automated sleep system of claim 12, the box frame further comprising:
an air compressor for providing the compressed air;
an air supply hose connected to the air compressor and the tool head, and configured to deliver compressed air from the air compressor to the tool head; the compressed air used by the tool head to adjust the air pressure of each of the plurality of support cylinders.

15. The automated sleep system of claim 14, each of the plurality of support cylinders comprised of a therapeutic module disposed within the top surface of the support cylinder, each therapeutic module connected to the control module, the control module configured to control the therapeutic modules.

16. The automated sleep system of claim 15, wherein each of the plurality of support cylinders have a cross section shape selected from a group of shapes comprising: a circle, a hexagon, a square, and an octagon.

* * * * *